2,743,998
APPARATUS FOR THE CATALYTIC CRACKING OF HYDROCARBON OILS

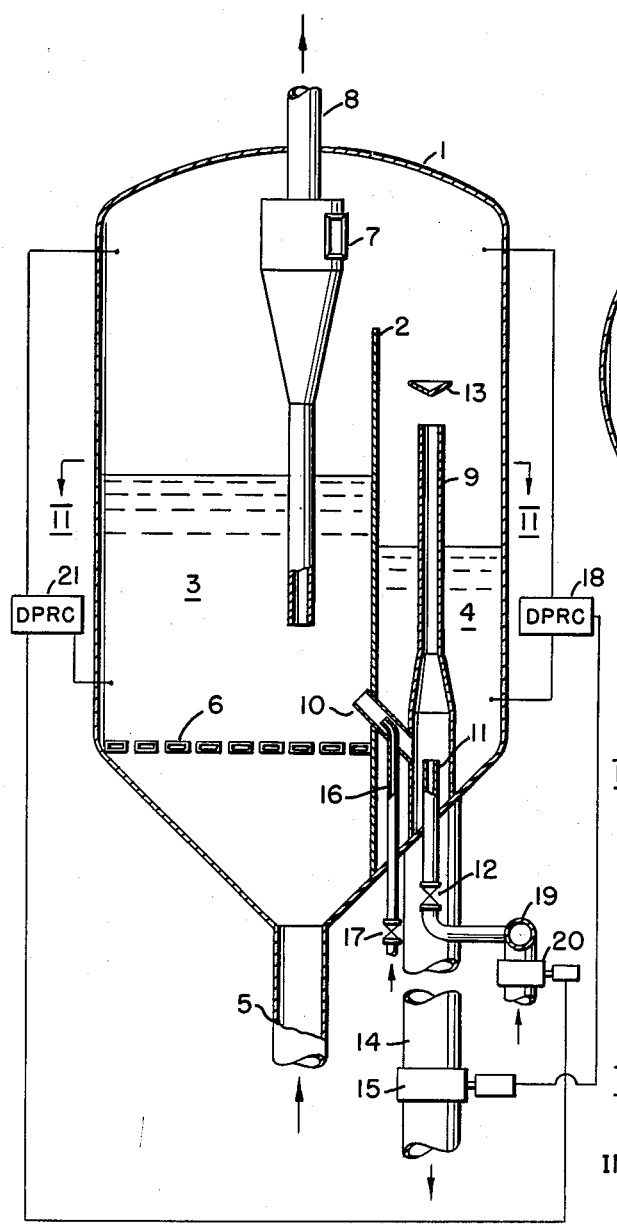
FIG. I
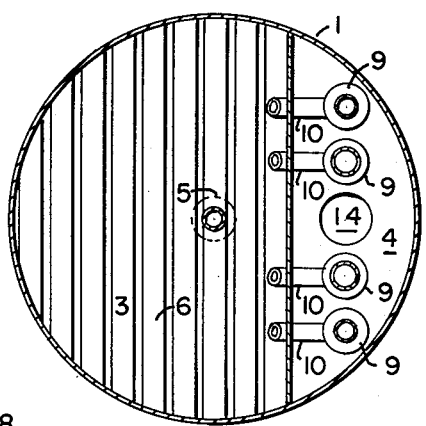
FIG. II
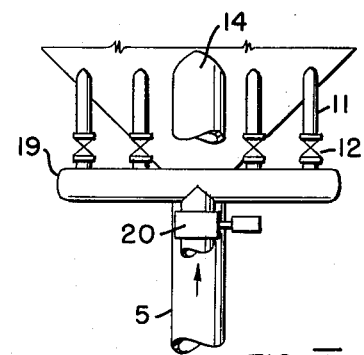
FIG. III
INVENTORS
PIETER OTTO
KAREL SWART
KAREL LAMBERTUS HAGEMANS
BY *James Todorovic*
THEIR ATTORNEY May 1, 1956 K. SWART ET AL 2,743,998
APPARATUS FOR THE CATALYTIC CRACKING
OF HYDROCARBON OILS
Filed Feb. 21, 1955 2 Sheets-Sheet 2
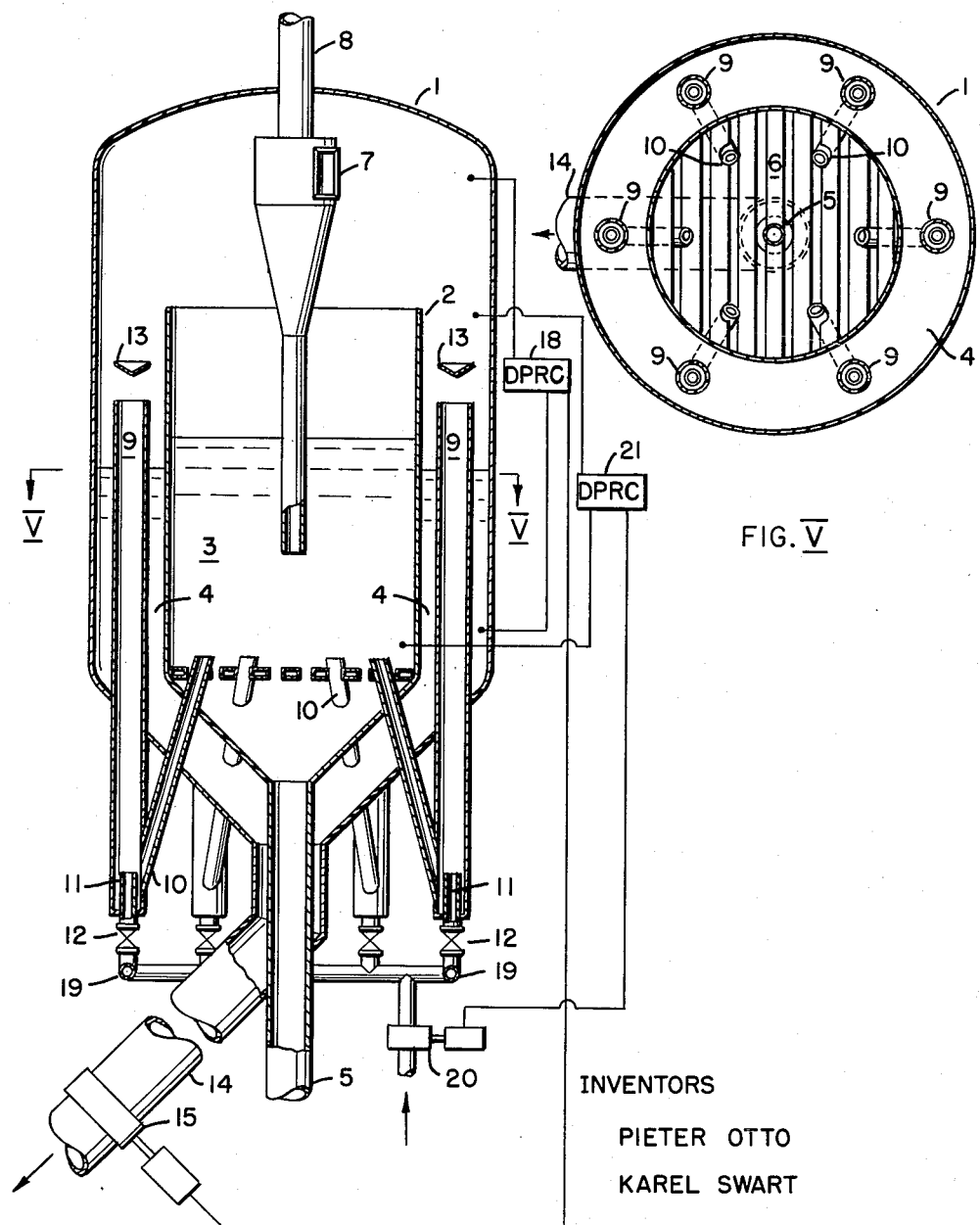
FIG. V
FIG. IV
INVENTORS
PIETER OTTO
KAREL SWART
KAREL LAMBERTUS HAGEMANS
BY James Todorovic
THEIR ATTORNEY United States Patent Office 2,743,998
Patented May 1, 1956

Karel Swart, Karel Lambertus Hagemans, and Pieter Otto, The Hague, Netherlands, assignors to Shell Development Company, New York, N. Y., a corporation of Delaware Application February 21, 1955, Serial No. 489,598

Claims priority, application Netherlands February 23, 1954

4 Claims. (Cl. 23—288)

This invention relates to an improved apparatus for carrying out the catalytic cracking of hydrocarbon oils with the use of a fluidized finely divided cracking catalyst.

In the catalytic cracking of hydrocarbon oils with the use of a fluidized cracking catalyst carbonaceous deposits are formed on the catalyst as the result of which its activity is decreased. In order to reactivate the catalyst it is necessary to draw off spent catalyst continuously from the reaction space and burn off these carbonaceous deposits in a separate regenerator after which the catalyst is used again. Moreover, hydrocarbons are adsorbed by the catalyst which has more or less large porosity and hydrocarbons are also entrained by the catalyst during its passage from the reaction zone to the zone of regeneration. For this reason before regenerating the catalyst it is usual to treat it with steam or another gaseous stripping agent in order to remove the larger part of the adsorbed and entrained hydrocarbons which would otherwise be lost through combustion in the regeneration treatment. In the cracking process the fluidized catalyst thus flows from the reactor via a stripping space or zone to the regenerator from where it is recycled to the reactor.

Stripping of the catalyst stream issuing from the reactor is a very important step in such catalytic cracking processes as it reduces the loss of valuable hydrocarbons, increases the yield of gasoline and other valuable products, and decreases the regeneration load. This stripping operation can be carried out in a separate stripping vessel provided between the reactor vessel and the regenerator vessel. As compared to a separate stripping vessel, the use of an internal stripping zone which forms a separate section of the reactor vessel has the advantage that the necessary apparatus is much simpler, since the arrangement of a separate stripper vessel complete with cyclones for separating entrained particles of catalyst from the vapors and the various necessary supporting structures can be omitted.

It has been found that when a conventional internal stripping zone is used in which steam or other gaseous medium is passed through a dense phase of fluidized catalyst the obtainable stripping effect leaves much to be desired. When effecting the treatment in this manner, it is found that a large part of the entrained and adsorbed hydrocarbons are not stripped from the catalyst and are consequently carried to the regenerator. Moreover, conditions in the stripping zone are such that there is considerable after-cracking of the hydrocarbons in the stripping zone with the formation of gases and coke as a result of which the amount of carbonaceous material which has to be burned in the regenerator is undesirably large.

A further examination of the cause of low efficiency obtained with conventional internal stripping zones showed that these are mainly to be attributed to unsatisfactory mixing of the steam with the catalyst mass in the stripping zone. If the bed of fluidized catalyst in the reaction zone is maintained at a level which is higher than the top of the partition wall between the stripping zone and the reaction zone, a considerable recirculation of catalyst between the stripping zone and the reaction zone occurs, which leads to a heavy extra load in the stripping operation. Some improvement can be effected by dividing the stripping zone by means of vertical partitions into a number of cells open at the top and bottom, but also in this case, the stripping results are still unsatisfactory.

The object of the invention is to provide a new and improved catalytic reactor containing an internal stripping zone in which the stripping operation may be carried out in such a way that a substantially larger amount of the entrained and adsorbed hydrocarbons is removed and after-cracking is reduced to a minimum. A further object of the invention is to provide an apparatus wherein improved stripping may be effected most economically. A further object of the invention is to provide a catalytic cracking reactor which is inexpensive to construct and easily controlled during the operation.

The apparatus to be described is particularly applicable in catalytic cracking of hydrocarbon oils in a system in which a fluidized finely divided cracking catalyst is continuously recycled through a reactor containing the reaction zone, an internal stripping zone within the reactor vessel, and a separate regenerator vessel, and the vapors from the stripping zone are withdrawn from the reaction zone mixed with the products of the cracking.

The fluidized bed of catalyst in the reaction zone is kept separate from that in the stripping zone by means of a partition or wall which extends above the maximum level of the catalyst bed in the reaction zone. The catalyst is carried in a dispersed phase from this bed in the reaction zone via one or more riser lines extending above the level of the catalyst bed in the stripping zone. The catalyst thus transported into the stripping zone by means of steam or an equivalent stripping gas is largely stripped during the transport and the stripped catalyst flows from the bottom of the stripping zone to the regenerator via a line provided with a suitable automatically regulated valve. The setting of this valve is automatically regulated to maintain a constant desired low level of fluidized catalyst in the stripping zone.

The flow of catalyst from the reaction zone to the stripping zone is regulated by automatically regulating the amount of stripping agent introduced into the risers in accordance with the changes in the level of the fluidized catalyst bed in the reaction zone. This is necessary since the pressure in the dilute phase above the catalyst bed in the reaction zone is practically equal to that at the top of the stripping zone and consequently any change in the level of the catalyst bed in the reaction zone is accompanied by a change in the pressure drop through the riser lines.

Almost immediately after the catalyst leaves the reaction zone, the greater part of the entrained and adsorbed hydrocarbons, e. g. 80% or more, is removed from the catalyst stream in the riser lines through which the catalyst is transported in suspension to the stripping zone by means of steam or other stripping gas. Under prevailing conditions, in particular, the great space velocity, after-cracking of entrained and adsorbed material during this passage does not occur, or scarcely at all. Steam is introduced into the dense bed of catalyst in the bottom of the stripping zone in order to maintain this catalyst in a free-flowing state. The space velocity in this zone is low and the residence time of catalyst is thus relatively long, e. g. of the order of minutes. Also, the temperature in this zone approaches closely that in the reaction zone. The conditions here are thus favorable for cracking of remaining adsorbed substantially non-vaporizable material. The products of such cracking are removed with the steam so that the amount of carbonaceous material which is finally transmitted to the regenerator is reduced.

In the apparatus of the invention the reaction zone and the stripping zone are in communication with each other at the top, i. e. above the partition wall which separates these zones to a height above the maximum level of the fluidized bed maintained in the reaction zone. One or more riser lines are provided in the stripping zone and means are provided for the introduction of steam or other stripping material in controlled amounts in the riser lines which extend to above the level of the catalyst bed in the stripping zone. These riser lines through which the catalyst is introduced from the reaction zone to the stripping zone may be mounted in the following ways: They may consist of one or more straight pipes which extend from the bottom of the reaction zone through the partition wall in an oblique upward direction to the top portion of the stripping zone, or they may be arranged against the partition wall in the stripping zone and communicate with the reaction zone at the bottom via an opening in this wall. Another embodiment consists of vertical pipes with a curved part at the bottom extending through the partition wall into the reaction zone.

According to a special embodiment which has proved particularly effective, and is therefore to be preferred, risers are used which are arranged vertically in the stripping zone and communicate with the reaction zone via standpipes which extend from the reaction zone in an oblique downward direction to the bottom of the riser lines. The risers and standpipes may be placed entirely within the reactor vessel in which case the standpipes may be relatively short, or the risers and standpipes may extend downward to a point outside and below the reactor vessel.

In order to separate effectively the vapors from the mixture of vapors and catalyst leaving the risers, the latter should be sufficiently long to extend above the level at which the catalyst bed in the stripping zone is maintained.

Any inert gaseous or vaporous medium may be used as a stripping agent; in practice steam is generally used.

Variations in the transport rate of the catalyst in the risers used in the process according to the invention, caused by a change of level in the catalyst bed in the reaction zone, should be avoided during the process as far as possible. This is done in a simple and effective way by controlling the amount of steam fed in the risers or by adjusting a slide valve provided in the standpipe or pipes towards the riser or risers. It has been found, however, that the amount of steam has to be kept within certain fairly narrow limits, since on the one hand there is a minimum quantity of steam below which sufficiently effective stripping is no longer possible, and on the other hand excessive quantities of steam are to be avoided, not only for reasons of economy but also in order to prevent excessive entrainment of catalyst particles with the vapors from the stripping zone to the cyclone-separators in the top portion of the reactor. In this connection it was found desirable, under normal operating conditions in practice, to maintain the quantity of steam to be passed into the risers at between about 2 and 4 kg. per ton of recycled catalyst.

It has been found that when only a simple single riser is provided for transporting the catalyst from the reaction zone to the stripping zone, it is impossible to maintain the quantity of steam introduced between the limits indicated for each level at which it is desired to keep the catalyst bed in the reaction zone. When the level in the reaction zone is high, the steam supply for a specific flow of catalyst would be too small, and too high when the level is low.

A method of obviating the above drawback consists, for example, of introducing the steam at different points, situated at different levels in the riser; in this case the higher the level of the catalyst bed in the reaction zone, the higher is the steam injection point.

Another particularly effective method consists in providing in the system for transporting catalyst from the reaction zone to the stripping zone more than one, e. g. 2, 4 or 6 risers, each of which is provided at the bottom with a steam inlet and can be put in or out of operation separately, so that it is possible to alter the total cross-section of risers available for the transport of catalyst as and when required.

The total cross-section of the risers is, in this case, so chosen that when operating at a low level of the catalyst bed in the reaction zone, the total number of risers present in the stripping zone should be used for the quantity of steam lying between the limits indicated above to be sufficient in the stripping operation.

When it is necessary to operate at a higher catalyst level in the reaction zone, e. g. in connection with a change-over to another starting material, one or more of these risers may be put out of operation, so that the total cross-section available for transport of catalyst becomes smaller as a result; in order to keep the catalyst flow constant, the steam supply in the risers still in use is then increased to such an extent that its total approximately corresponds to the total steam supply required when all risers are in use.

Although the various risers may all have the same diameter, it is advisable to choose varying diameters for the purpose, as this increases the flexibility of the apparatus.

One of the risers may be put out of operation by greatly reducing the supply of steam or another inert gaseous medium to that riser line. In this case it is desirable to keep open any oblique supply lines connected with the risers not in use by introducing therein a little steam or other inert gaseous medium. To this end a nozzle may be provided at the bottom of these oblique standpipes by means of which steam can be injected upwards when the riser belonging thereto is put out of operation.

The desired level of the catalyst bed in the stripping zone is automatically maintained by means of a regulating valve in the standpipe for discharging stripped catalyst from the stripping zone to the regenerator.

Considerably better results are obtained by employing the process of the invention, in which most of the hydrocarbons entrained with the catalyst and adsorbed therein are thus stripped extremely more quickly than was possible by means of the conventional internal strippers hitherto used. Thus, for example, the amount of coke which has to be burnt off the catalyst is reduced by 15% to 20% and there is a corresponding increase in the quantity of valuable hydrocarbon products obtained.

Accordingly, the present invention is a considerable improvement, and in particular, is especially attractive, as existing fluidized catalyst cracking plants with an internal stripping zone can easily be adapted to obtain the improvement.

The invention is further illustrated below with reference to the drawing in which Figures I and II show a diagram of the vertical and horizontal cross-section, respectively, of a reactor for the catalytic cracking of hydrocarbon oils which has a segmental stripping zone. Figure III shows a detail of the outside riser piping and valve arrangement of the apparatus of Figures I and II. Figures IV and V show the corresponding cross-sections of a catalytic cracking reactor with an annular stripping zone.

In Figure I, the reactor 1 is divided by a vertical wall 2 extending in the form of a chord through the horizontal cross-section of the reactor, into a reaction zone 3 and a stripping zone 4. The wall 2 is sufficiently high to extend above the maximum level at which the fluidized catalyst bed in the reaction zone is maintained; the vapor spaces above the catalyst beds in the reaction zone and the stripping zone communicate with each other above the top of this wall.

The reactor 1 is provided at the bottom with a line 5 for supplying the oil to be cracked and catalyst, and also with a distributing grid 6 extending over the cross-section of the reaction zone. Cracked products, together with vapors issuing from the stripping zone, are discharged through the line 8 to a fractionator (not shown), via the cyclone 7 for separating entrained catalyst particles which are recycled to the catalyst bed in the reaction zone 3.

In order to bring about the improved stripping according to the invention, a number of risers 9 are mounted in the stripping zone 4, these extending above the level of the catalyst bed in the stripping zone. There are four of these in Figure I, the two central risers having a greater diameter than the other two.

All the risers 9 communicate via the standpipes 10 with the catalyst bed in the reaction zone 3, and are provided at the bottom part with a line 11 containing a valve 12 for introducing steam in an upward direction, while a baffle plate 13 is provided at a short distance above each line 9. Catalyst is transported from the reaction zone 3 via the standpipes 10 to the catalyst bed in the stripping zone 4 by means of the steam injected into the bottom of the risers 9. During this transport, in which the catalyst flows through the risers in a dispersed phase and the residence time therein is very short, e. g. some seconds only, the entrained and adsorbed vaporizable hydrocarbons present in the catalyst mass are largely stripped from it. The catalyst particles thus stripped, which collide with the baffle plates 13 after leaving the risers 9, fall by gravity into the catalyst bed in the stripping zone 4; during the relatively long residence in this bed the non-vaporizable and the remaining vaporizable hydrocarbons still present in the catalyst are after-cracked to a considerable extent. Steam or another inert gaseous medium is introduced into the bottom of this bed via an inlet (not shown) in order to maintain the bed in a fluidized state and to discharge the vapors from the top of the bed.

Stripped catalyst is discharged from the stripping zone via the standpipe 14 with regulating valve 15 to the regenerator (not shown) in which carbon deposits are burnt off the catalyst. The setting of valve 15 is automatically regulated by a suitable mechanism which is responsive to changes in differential pressure between a point within the catalyst bed in the stripping zone and a point above the bed. In the apparatus illustrated in Figures I and IV the differential pressure recorder controller 18 effects this control to maintain any desired level in the stripping zone.

By adjusting the quantity of steam introduced during the transport of catalyst to the stripping zone care must be taken to ensure that when there are changes in the level of the catalyst bed in the reaction zone 3, conditions of the flow of catalyst from the reaction zone to the stripping zone remain practically constant.

When the catalyst bed in the reaction zone 3 is maintained at a low level, all four risers 9 are used, the catalyst transported through them being very effectively stripped by a supply of steam which lies within the desired range of 2 to 4 kg. per ton of circulated catalyst. Thus, the valves 12 are all open and each of the riser lines receives steam from the header line 19. The quantity of steam is automatically regulated in response to changes in the level of the bed in the reactor 3. Thus, valve 20 which controls the amount of steam passed to the manifold is automatically controlled to maintain the desired catalyst bed level. In the apparatus illustrated in Figures I and IV the differential pressure recorder controller 21 controls valve 20.

If it is required to work at a higher level of catalyst bed in the reaction zone 3, one or more of the risers 9 are put out of operation. This is effected by closing one or more of the valves 12. Since the total quantity of steam is essentially unaltered, the steam rate in the remaining risers is therefore increased and the rate of catalyst transport maintained. Thus, the catalyst circulation rate may be maintained at any given value at any desired catalyst bed height in the reactor while maintaining the total steam rate within the necessary limits.

The bottom of each standpipe 10 is provided with a supply line 16 with valve 17 by means of which it is possible to introduce steam or inert gas in an upward direction into the standpipes which communicate with risers which are put out of operation, so as to ensure that the catalyst mass in these standpipes remains in a fluidized state, thus preventing the standpipes from becoming blocked.

In the reactor shown in Figures IV and V wherein like parts are designated by the same reference numbers as in Figures I and II, the stripping zone 4 is arranged in the form of a ring around the central reaction zone 3. Six vertical risers 9 are mounted in the annular stripping zone 4, these extending downward to the outside of the reactor and communicating with the reaction zone 3 via the standpipes 10. Otherwise the arrangement corresponds to that of Figures I and II.

In this case, too, the transport of catalyst from the fluid bed in reaction zone 3 to that in the stripping zone 4 via the standpipes 10 and risers 9 is effected by means of the stripping steam introduced through the manifold line 19 and supply lines 11, containing shut-off valves 12. During this transport of catalyst in a dilute phase in the risers 9, most of the entrained and adsorbed hydrocarbons are stripped from it, there being practically no after-cracking.

We claim as our invention:

1. A fluidized catalyst reactor having an internal stripping zone which comprises in combination a single cylindrical vessel having top and bottom closures and designed to operate with a given working level range of fluidized bed of catalyst; a vertical partition within said vessel sealed to the bottom thereof and extending upward within said vessel to a point above the working level range in said vessel but short of the top of said vessel, thereby dividing the horizontal cross section of said vessel in the lower portion only into two separate and isolated zones or compartments referred to as the reaction zone and stripping zone, respectively; at least one exit line at the top of said vessel for withdrawing a mixture of vaporous products and stripping gas evolved from the respective zones; at least one inlet line for the introduction of catalyst into said reaction zone; at least one outlet line at the bottom of said stripping zone and adapted for the withdrawal of catalyst from said zone and said vessel; a plurality of inclined standpipes open at their upper ends below the working level range in the reaction zone, said inclined standpipes passing through said partition and connecting with vertical riser lines; said vertical riser lines extending upward within said stripping zone to a point above the working level range but below the top of said partition; pressure-sensing elements in said reaction zone and stripping zone above and below said working level range adapted to continually sense the differential pressures due to catalyst bed height in each of said zones; automatically controlled valve means in said last-mentioned catalyst outlet line; a steam line having flow control regulating means discharging upwardly into the bottom of each of said vertical riser lines in said stripping zone; an automatic control mechanism arranged to regulate the flow of steam in said riser lines in response to changes in differential pressure sensed by said pressure-sensing elements in the reaction zone; an automatic control mechanism arranged to regulate said first-mentioned automatic control valve means in said catalyst withdrawal line in response to changes in differential pressure sensed by said pressure-sensing elements in the stripping zone.

2. A fluidized catalyst reactor as claimed in claim 1, wherein the riser lines have at least two different diameters.

3. A fluidized catalyst reactor having an internal stripping zone which comprises in combination a single cylindrical vessel having top and bottom closures and designed to operate with a given working level range of fluidized bed of catalyst; a vertical partition within said vessel sealed to the bottom and sides thereof, and extending upward within said vessel to a point above the